United States Patent [19]

Bernecker

[11] 4,103,658

[45] Aug. 1, 1978

[54] CARBURETOR

[75] Inventor: Gunther Bernecker, Montvale, N.J.

[73] Assignee: Donald B. Conlin, Mahwah, N.J.; a part interest

[21] Appl. No.: 872,707

[22] Filed: Jan. 26, 1978

Related U.S. Application Data

[63] Continuation-in-part of Ser. No. 806,798, Jun. 15, 1977, which is a continuation-in-part of Ser. No. 770,964, Feb. 22, 1977, Pat. No. 4,086,893.

[51] Int. Cl.² ............................................. F02M 33/00
[52] U.S. Cl. .................. 123/133; 123/122 E; 261/121
[58] Field of Search ............... 123/122 E, 122 R, 133, 123/139 BG; 261/121, 119

[56] References Cited

U.S. PATENT DOCUMENTS

| 306,924 | 10/1884 | Hopkins | 123/133 |
| 390,710 | 10/1888 | Shanck | 123/133 |
| 420,591 | 2/1890 | Dawson | 123/133 |
| 1,267,185 | 5/1918 | Coffman | 123/122 E |

Primary Examiner—Ronald H. Lazarus
Attorney, Agent, or Firm—C. Bruce Hamburg

[57] ABSTRACT

A carburetor for an internal combustion engine comprises a housing, porous matter contained in the housing, means for injecting fuel into the housing and onto the porous matter to effect completion of vaporization of the fuel, means for admitting air into the housing to form a mixture with the vaporized fuel and means for conducting the mixture out of the housing for combustion in the engine. Preferably, means are provided for transferring heat from the exhaust gases of the engine to the housing and the porous matter and to the fuel before the fuel is injected into the housing.

4 Claims, 7 Drawing Figures

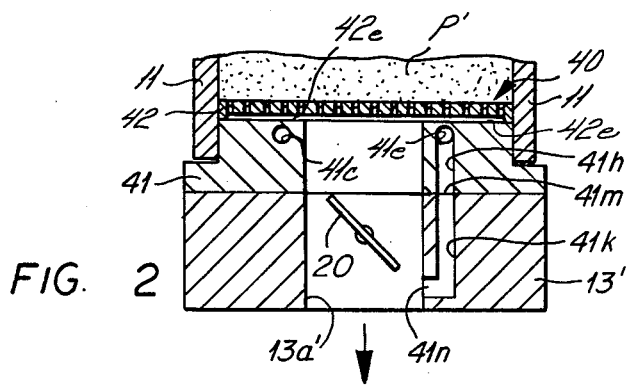
FIG. 2
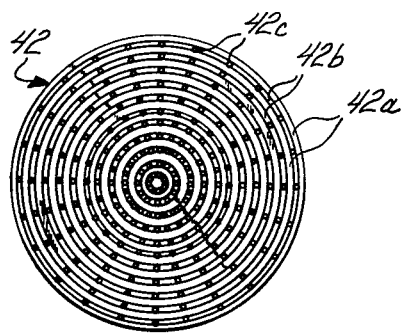
FIG. 3
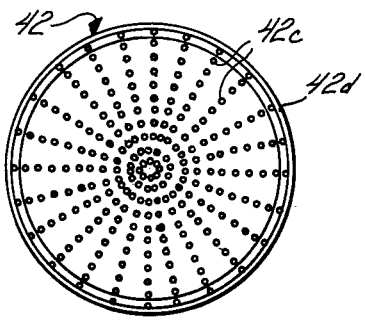
FIG. 4
FIG. 5
FIG. 6
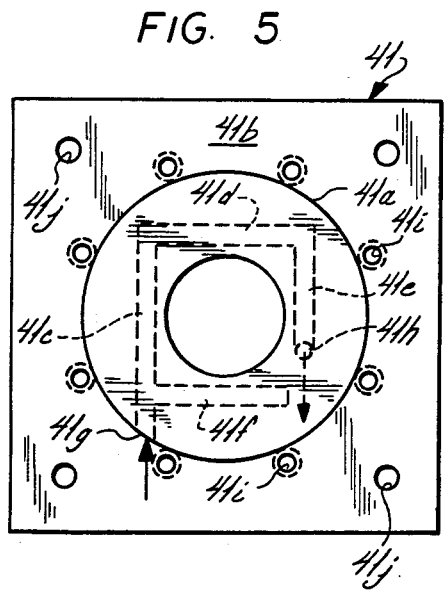
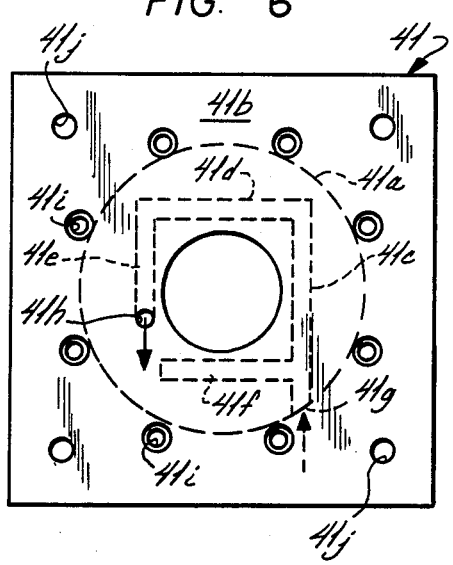

CARBURETOR

REFERENCE TO RELATED APPLICATION

This is a continuation-in-part of application Ser. No. 806,798, filed June 15, 1977, which, in turn, is a continuation-in-part of application Ser. No. 770,964, filed Feb. 22, 1977.

BACKGROUND OF THE INVENTION

This invention relates to a novel carburetor for an internal combustion engine.

There is a great demand for motor vehicle internal combustion engines which will consume fuel more efficiently, resulting in greater mileage (miles per gallon) and less exhaust of hydrocarbons. Moreover, engines of lower initial cost are very much wanted.

It is an object of this invention to provide an improved internal combustion engine carburetor which is very much simpler and less expensive than prior art carburetors and which results in more efficient fuel consumption with consequent greater mileage and less exhaust of hydrocarbons.

Other objects and advantages of the invention will be apparent from the following description.

SUMMARY OF THE INVENTION

According to the invention, there is provided an improved carburetor which insures sufficient heating of the fuel and the mixture of fuel and air so that the fuel will be completely vaporized before entering the intake manifold of the engine.

The carburetor of the invention comprises a housing, porous matter contained in the housing, the porous matter being inert relative to the fuel for the engine, means for injecting fuel into the housing and onto the porous matter to effect completion of vaporization of the fuel, means for admitting air into the housing simultaneously with the injection of the fuel to form a mixture with the vaporized fuel and means for conducting the mixture out of the housing for combustion in the engine. The term "carburetor" as used herein means apparatus that forms a mixture of vaporized fuel and air. It is readily seen from the description of the invention herein that this is not a conventional "carburetor" in the sense in which that term is more commonly used and in which fuel is atomized in a stream of air with the assistance of a venturi. The porous matter is typically a porous mineral or refractory material such as porous (unglazed) ceramic, broken up brick, cinder block or lava and the like. However, in principle, porous metallic or other porous materials, such as sintered metallic compositions, which can physically and chemically withstand the hot fuel, hot air and hot mixtures of fuel and air in the carburetor, are also suitable.

The injecting means are typically nozzles or jets which spray the fuel. Complicated systems of pumps and injectors common in conventional fuel injection systems and complicated structures common in conventional carburetors are avoided. In the present invention, two injecting means can suffice for a six or eight cylinder engine and a single injecting means can suffice for a four cylinder engine.

According to the present invention, the fuel is preferably heated to an at least partially vaporized condition before being injected. To this end there may be provided a heat exchanger in which heat is transferred from the hot exhaust gases or from the hot engine coolant to the fuel. For example, the heat exchanger may be in the form of a shell, i.e., a vessel, through which hot exhaust gases or the hot coolant is passed and a coil-shaped segment of the fuel line in the shell. Likewise for the purpose of helping to assure complete vaporization of the fuel, the hot exhaust gases or the hot coolant may also be conducted through means for transferring heat from the hot exhaust gases or the hot coolant to the carburetor housing and the porous matter contained therein. Transfer of heat from hot coolant to the housing and porous matter in the housing and/or to the fuel line is, in general, practically effective only if the engine coolant is water or other liquid and not if the engine coolant is air. It is optional to provide auxiliary electrical resistance heating means for the fuel line and/or for the carburetor to augment any heating provided by the exhaust gases or by the coolant before the exhaust gases or the coolant have reached their respective normal temperatures during operation of the engine. Such heating means may be thermostatically controlled to be turned off once the exhaust gases or the coolant have been fully heated.

In the most preferred embodiment of the present invention, in which the efficiency of engine operation, practicality, and adaptability of the invention are the greatest, the aforementioned heating of the fuel, the housing and the porous matter contained in the housing are effected solely by means for transferring heat from the exhaust gases to the fuel line and to the housing and the porous matter contained therein. Among the advantages of this arrangement are the applicability thereof to an air-cooled engine as well as to a liquid cooled engine. Another advantage of this arrangement is that once the engine has reached its normal operating temperature, sufficient heat can readily be transferred from the exhaust gases to the fuel line to assure that the fuel is in a substantially completely vaporized state when it is injected into the housing. The relatively cooler air which is drawn into the housing may cause some of the vaporized fuel to condense. However, the means for transferring heat from the exhaust gases to the housing and the porous matter assure revaporization of any condensed fuel. Preferably, the exhaust gases are tapped off from the exhaust manifold, utilized to preheat the fuel by means of the aforementioned type of heat exchanger or equivalent thereof and then conducted to means for transferring heat from the hot exhaust gases to the housing and the porous matter contained therein. The housing includes a base, and the means for transferring heat from the exhaust gases to the housing and the porous matter contained therein preferably comprises passages formed in the base for the conducting of the exhaust gases therethrough.

BRIEF DESCRIPTION OF THE DRAWING

The invention will now be further described by reference to specific embodiments as illustrated in the drawings, in which:

FIG. 2 is a like cross section of a portion of another embodiment of a carburetor according to the invention;

FIG. 3 is a plan view of the top face of one of the elements of the embodiment of FIG. 2;

FIG. 4 is a plan view of the bottom face of the element of FIG. 3;

FIG. 5 is a plan view of the top face of another element of the embodiment of FIG. 2;

FIG. 6 is a plan view of the bottom face of the element of FIG. 5; and

DETAILED DESCRIPTION OF PREFERRED EMBODIMENTS

Figure 1:
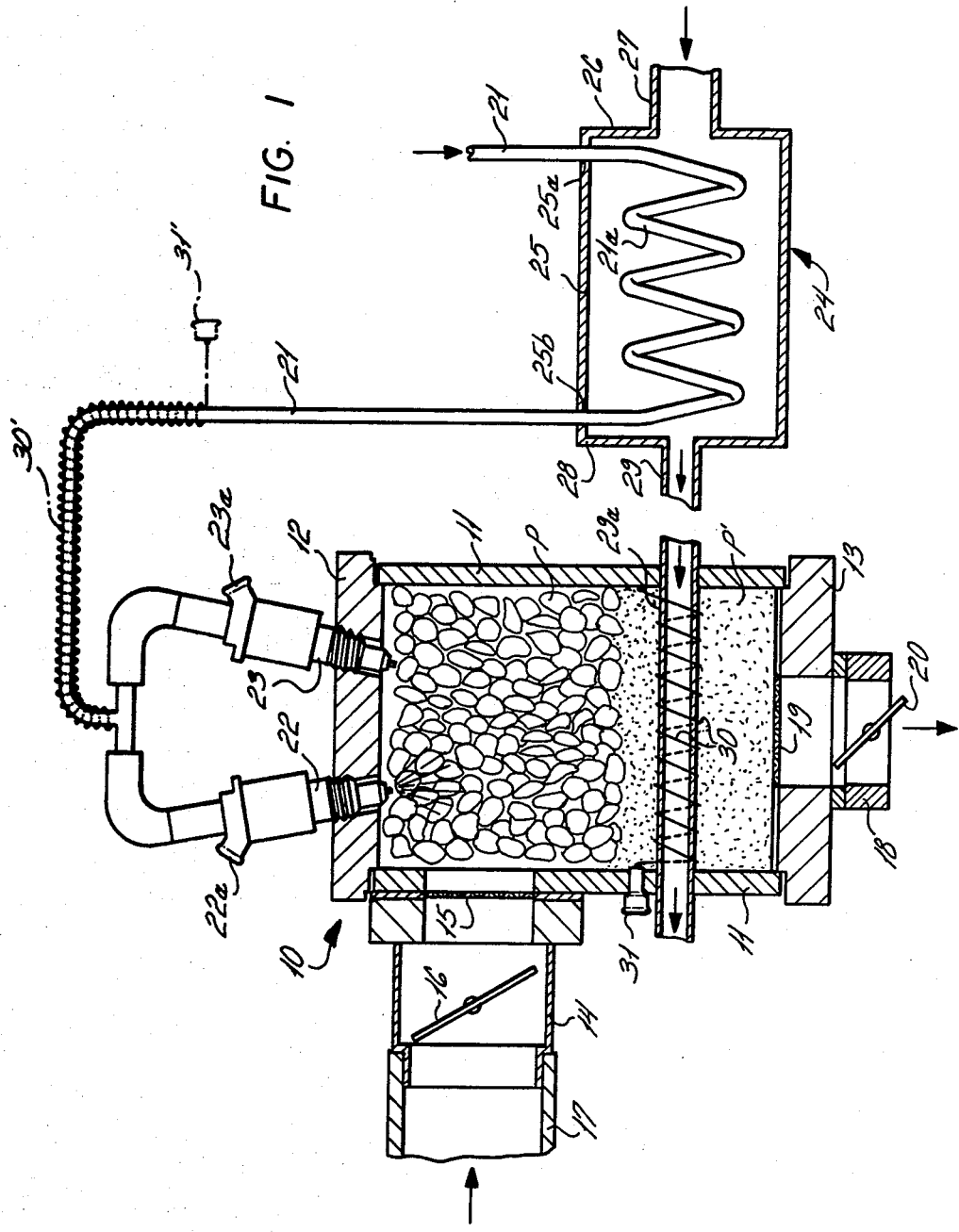
FIG. 1 is a cross section of an embodiment of a carburetor according to the invention.

The carburetor 10 is in the form of a housing having a cylindrical side wall 11 provided with upper and lower closures 12 and 13.

Communicating with an inlet opening in the upper portion of the wall 11 is an air intake nipple 14. A screen 15 is provided across the inlet opening for filtering out particulate matter. A butterfly valve 16 is arranged in the air intake nipple 14. The distal end of the intake nipple 14 is connected to an air intake pipe 17.

Communicating with an outlet opening in the lower closure 13 is an outlet nipple 18. A screen 19 is provided across the outlet opening for retaining in the housing the hereinafter described matter while permitting the mixture of vaporized gasoline and air formed in the carburetor to discharge. A butterfly valve 20 is arranged in the outlet nipple 18. The distal end of the outlet nipple 18 communicates with the intake manifold of the engine, which is not illustrated.

The fuel line 21 communicates with a pair of conventional fuel injectors 22 and 23 which are received in respective openings in the upper closure 12. The tips of the injectors project slightly into the housing 11. The injectors 22 and 23 are connected to the electrical system of the motor vehicle (not illustrated) by means of conventional electrical connectors 22a and 23a, respectively.

The housing is substantially filled by an upper bed of small porous ceramic pieces P and a lower bed of smaller porous ceramic particles P'.

An optional feature of the invention is auxiliary heating means for the fuel being fed to the injectors 22 and 23 through the fuel line 21 and for the ceramic material in the housing. A heat exchanger 24 is provided having a cylindrical shell 25 communicating with the interior of which through one end wall 26 thereof is an inlet pipe 27 and communicating with the interior of which through the opposite end wall 28 thereof is an outlet pipe 29, the outlet pipe 29 being of smaller internal diameter than the inlet pipe 27. A portion of the fuel line 21 is formed into a helical coil 21a which is inside and substantially coaxial with the shell 25 and the inlet end of which is fed by the entering of the fuel line 21 into the shell 25 at an opening 25a in the shell 25 near the end wall 26 and the outlet end of which communicates with the portion of the fuel line 21 passing out of the shell 25 at an opening 25b in the shell 25. The inlet pipe 27 connects the shell 25 to the conventional cooling system of the motor vehicle (not illustrated) and, in particular, to the line carrying the fluid coolant, typically water or an aqueous solution of a conventional organic water freezing point depressant and boiling point elevator. For convenience, the coolant will hereinafter be referred to as "water." A portion 29a of the outlet pipe 29 passes diametrically across the interior of the housing, entering and leaving the housing through a pair of respective openings provided in the wall 11 for the purpose. An electrical heating coil 30 is helically wrapped around pipe portion 29a and is connected to an electrical connector 31 which passes through the wall 11, the connector 31 being connected to the conventional electrical system of the motor vehicle (not illustrated) whereby the coil 30 receives power from the electrical system. Alternatively, as illustrated in phantom, an electrical heating coil 30' is helically wrapped around a portion of the fuel line 21 near the injectors 22 and 23 and is connected to an electrical connector 31' which is connected to the conventional electrical system of the motor vehicle whereby the coil 30' receives power from the electrical system. The fuel line 21 is covered with thermal insulation (not illustrated) which covers the exterior of the coil 30' as well, the connector 31' of course penetrating through or being totally outside the insulation to permit the necessary connection to the electrical system of the motor vehicle.

When the ignition is switched on, fuel is pumped through the line 21 to the injectors 22 and 23 which alternately inject the fuel onto the porous ceramic pieces P. Two injectors are usually necessary to provide an adequate fuel supply for a six or eight cylinder engine whereas one injector may be adequate for a four cylinder engine. The ceramic pieces P, particularly due to their porosity, cause the fuel to be distributed over a large surface area, resulting in essentially complete vaporization of the fuel, particularly once the engine has warmed up. Some of the fuel may not vaporize on the ceramic pieces P but trickle down through the ceramic pieces P and onto the ceramic particles P'. These, too, are porous and, due to being smaller than the pieces P, have an even larger specific surface area, facilitating vaporization of the fuel which theretofore had not vaporized.

Before the engine reaches its normal elevated operating temperature, typically 175°-185° F, at which vaporization of the fuel occurs more readily, supplemental heating of the carburetor to facilitate vaporization of the fuel may be desirable. Moreover, even after the engine has reached its normal elevated operating temperature, it may be desirable to provide supplemental heating of the carburetor to assure that the engine heat is effectively transferred to the ceramic pieces and particles on which the completion of vaporization of the fuel or revaporization of fuel which has condensed is to take place. Also to help assure complete vaporization of the fuel, means may be provided for preheating the fuel before it enters the carburetor. Means for effecting all of the foregoing are provided in the exemplary embodiment illustrated herein. The engine's cooling water is fed through the shell 25 of the heat exchanger 24. Because the outlet pipe 29 from the shell 25 is of smaller diameter than the inlet pipe 27 to the shell 25, it is simple to design the dimensions of the system so that at steady state, the shell 25 remains filled with circulating cooling water. Once the engine is warmed up, the cooling water will be hot and will heat the fuel flowing through the coil 21a in the shell 25. Hence, the fuel will be injected into the carburetor housing in a pre-heated, partially vaporized condition. Typically, the fuel is gasoline and the pre-heating is to a temperature of about 175° to about 185° F. Also, because the pipe portion 29a is an extension of the outlet pipe 29, hot water will flow through it, too, and help heat the ceramic material in the carburetor housing typically to a temperature of about 175° F., particularly the ceramic particles in contact with or adjacent the pipe portion 29a. The electrical heating coil 30 can be used to provide more 'effective supplemental heating of the ceramic material during the initial period of operation of the engine before the engine has reached its normal elevated operating temperature. In particular, the heating coil 30 may be thermostatically controlled so that it is on only when the engine is below its normal operating temperature. Alternatively, it may be preferable that the heating coil be used instead to pre-heat the fuel outside the carburetor, to avoid any possibility of combustion occurring in the carburetor, though the ceramic particles are generally effective to keep fuel vapors from contacting the coil in such quantities as would present a critical combustion hazard. Again the coil would preferably be thermostatically controlled so that it is on only when the engine is below its normal operating temperature. The alternative location is illustrated in phantom as heating coil 30' with its electrical connector 31', the heating coil 30' preferably being helically wrapped around a portion of the fuel line 21 closely adjacent the injectors 22 and 23 so that essentially no heat is lost by the fuel before it is injected. Typically, the thermostat for heating coil 30 or 30' is set to turn the coil off at an engine, i.e., engine coolant, temperature of 175° F.

The admission of air through the air intake pipe 17 and the air intake nipple 14 to the carburetor housing is regulated by the butterfly valve 16 in the air intake nipple 14. The screen 15 filters particulate matter out of the air before the air enters the carburetor housing. The flow of the mixture of air and vaporized fuel formed in the carburetor housing from the carburetor housing to the intake manifold of the engine is controlled by a butterfly valve 20 in the outlet nipple 18 to which the intake manifold is connected. The screen 19 prevents the ceramic material from being blown out of the carburetor housing. The butterfly valves 16 and 20 are controlled by simple throttle linkages which open the butterfly valve 20 slightly before the butterfly valve 16 in order to allow free passage of the fuel-air mixture into the intake manifold as the mixture is formed. The further the operator of the motor vehicle depresses the accelerator pedal, the greater the rate at which fuel is injected by the injectors 22 and 23 and the further the valves 16 and 20 open whereby the rate at which the mixture of air and vaporized fuel is formed is progressively increased. Even when the valves 16 and 20 are closed, that is, when the accelerator pedal is not at all depressed, the valves 16 and 20 do not completely close off the air intake nipple 14 and the fuel-air mixture outlet nipple 18 so that the engine may be started up without necessarily depressing the accelerator pedal. In bench tests using a standard automobile engine at 1,200 r.p.m., this carburetor of the invention used as little as a third the amount of fuel consumed with the use of a standard carburetor.

With reference to the embodiment of FIGS. 2 - 6, the lower closure 13 and screen 19, which constitute the base of the carburetor housing and the nipple 18 in which the butterfly valve 20 is mounted, are replaced by means 40 for transferring heat from exhaust gases of the engine to the housing and the porous matter contained in the housing, and a base plate 13' in which the butterfly valve 20 is mounted. The heat exchanger 24, the inlet pipe 27 thereto, the outlet pipe 29 therefrom and the coils 30 and 30' and electrical connectors 31 and 31' are dispensed with.

The heat transfer means 40 consists of a plate 41 and a screening plate 42 supported by the plate 41. Machined on the top face of the screening plate 42 are a plurality of concentric circular ribs 42a separated by a plurality of concentric circular flats 42b. Drilled through the flats 42b are a plurality of pin holes 42c which do not permit passage of even the finer porous matter in the housing. Machined on the periphery of the bottom face of the screening plate 42 is an annular lip 42d, which forms a plenum chamber 42e between the bottom face of the screening plate 42 and the top face of the plate 41, the plenum chamber 42e communicating with the outlet opening formed through the center of the plate 41.

The plate 41 is constituted of an elevated disc 41a machined on a flat square base 41b. For conducting hot exhaust gases from the engine are drilled channels 41c, 41d, 41e and 41f in the disc 41a, having an exhaust gas inlet 41g on the cylindrical side wall of the disc 41a and an exhaust gas outlet 41h on the bottom face of the plate 41. A set of holes 41i is drilled through the plate 41 in a circular array adjacent the periphery of the disc 41a to receive screws (not illustrated) for fastening the plate 41 to the cylindrical side wall 11 of the housing, which is provided with threaded-holes (not illustrated) for receiving the screws. Near each corner of the plate 41 is drilled a hole 41j which may be used to receive bolts or screws for mounting of the base 41 onto other structures (not illustrated) if desired. The base plate 13' is attached to the plate 41 by such means as screws (not illustrated). Drilled in the base plate 13' is a channel 41k. The inlet end of the channel 41k is an opening 41m in the upper face of the plate 13' which is in alignment with the exhaust gas outlet 41h on the lower face of the plate 41. The outlet end of the channel 41k is an opening 41n below the butterfly valve 20 in the wall of the central bore 13a' of the plate 13' in which the butterfly valve 20 is mounted.

A very minor proportion of the exhaust gases are tapped off the exhaust manifold and conducted by conduit means to the inlet opening 41g of the plate 41. The exhaust gases flow through the channels 41f, 41c, 41d and 41e, pass from the exhaust gas outlet 41h in the plate 41 into the exhaust gas inlet 41m in the plate 13', flow through the channel 41k and exit through the outlet opening 41n into the bore 13a', where the exhaust gases mix with the mixture of fuel and air about to enter the intake manifold from the carburetor of the invention. Because the opening 41n is located downstream from the butterfly valve 20, the normal suction in the intake manifold during operation of the engine will serve to efficiently draw the exhaust gases through the path hereinabove described. Heat from the exhaust gases heats the disc 41a which, in turn, heats the cylindrical side wall 11 and the porous matter. Moreover, any unvaporized droplets of liquid fuel in the mixture of air and fuel which passes through the holes in the screening plate 42 will be vaporized in the plenum chamber 42e and on the top surface of the heated disc 41a.

Figure 7:
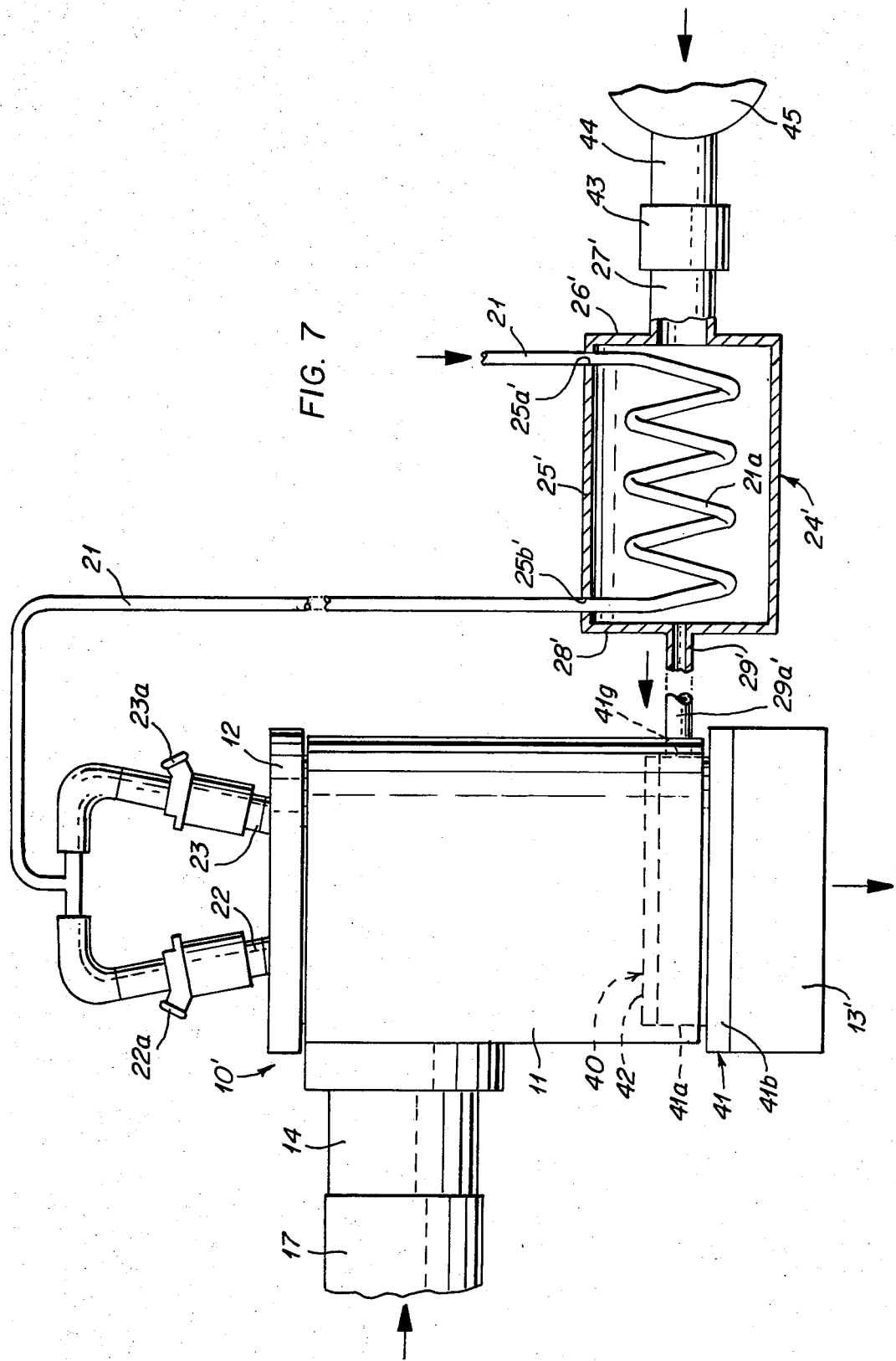
FIG. 7 is an elevation, partly in cross section, of another arrangement according to the invention, utilizing the carburetor of FIGS. 3 - 6.

In the embodiment of FIG. 7, which is the most preferred embodiment, the exact same reference numbers are used where the parts are exactly the same as in a heretofore described embodiment in such cases, it is not considered necessary to specifically refer to the parts again. Here, the carburetor itself, including the heat transfer means 40 incorporated in the base thereof, is structurally and functionally exactly the same as in the embodiment of FIGS. 2 - 6. To the shell 25' of the heat exchanger 24' are fed hot exhaust gases from the exhaust manifold 45. The exhaust manifold 45 communicates with the shell 25' by means of a pipe 44 which communicates with the interior of the exhaust manifold through a wall of the exhaust manifold, an inlet pipe 27' for the shell 25' which communicates with the interior of the shell 25' through an end wall 26' of the shell 25', and a coupling 43 which connects together the pipes 27' and 44. The coupling 43 is conventional. The ends of the pipes 27' and 44 are externally threaded and the coupling 43 is internally threaded, so that the pipes 27' and 44 can be connected and disconnected merely by rotating the coupling 43. Communicating with the interior of the shell 25' through the other end wall 28' thereof is an outlet pipe 29' of smaller internal diameter than the inlet pipe 27'. The downstream end portion 29a' of the pipe 29' is connected to the exhaust gas inlet 41g in the disc 41a in the carburetor housing, an opening (not illustrated) being provided in the cylindrical wall 11 of the housing for passage therethrough of the pipe end portion 29a'. It can thus be seen that in this embodiment, the exhaust gases are used both to pre-heat the fuel and to heat the carburetor housing and the porous matter in the carburetor housing. The exhaust gases are so hot that pre-heating of the fuel by means thereof results in the fuel being substantially completely vaporized when it enters the housing. The means for transferring heat from the exhaust gases to the porous matter and the interior of the housing assure, again because of the intense heat of the exhaust gases, particularly fast vaporization of any unvaporized fuel and revaporization of any vaporized fuel which has condensed.

While in the drawings the fuel injectors have been illustrated as passing through the upper closure 12 of the carburetor, it is just as well to have the injectors communicate with the interior of the housing through the side wall 11. As is apparent from the foregoing description of the invention, the means for injecting the fuel need not be fuel injectors, which deliver the fuel in pulses. When electrical fuel injectors, as illustrated in the drawings, were intentionally shorted out so that the injectors became mere nozzles from which the fuel sprayed continuously during operation of the engine, the performance of the carburetor of the invention did not suffer. Hence, the means for injecting the fuel in the present invention may be any nozzles or jets or like means. In the embodiments of FIGS. 2 – 7, the means at the base of the housing 10 for heating the porous matter and the interior of the housing 10 need not be of the particular construction herein illustrated but may simply be functionally equivalent thereto. For example, the plate 41 may be dispensed with, the plate 13' used itself as the closure for the bottom of the housing 10, a screen such as screen 19 of the embodiment of FIG. 1 arranged across the mouth of the bore 13a' and a flat spiral coil of highly heat conductive tubing, such as copper tubing arranged over the plate 13' in place of the plate 41. The outer end of the heating coil is connected through an opening in the housing wall 11 with the conduit 29', and the inner end of the heating coil is connected to the exhaust gas inlet opening in the plate 13'. The foregoing and all other modifications and variations utilizing the principles of the present invention are intended to be encompassed by the hereto appended claims.

What I claim is:

1. A carburetor for supplying a fuel/air mixture to an internal combustion engine having an intake manifold comprising a housing, contained in the housing only matter which is inert relative to the fuel, said matter being porous, means for injecting fuel into the housing and onto said porous matter, means for transferring sufficient heat from the exhaust gases of the engine to the fuel before the fuel is injected into the housing and means for transferring sufficient heat to the housing and the porous matter so that all the fuel is completely vaporized when it leaves the housing, means for admitting air into the housing simultaneously with the injection of the fuel to form a mixture with all the vaporized fuel and means for conducting the entire mixture out of the housing directly to the intake manifold during all phases of operation of the engine, for combustion in the engine.

2. A carburetor according to claim 1 in combination with a fuel line communicating with the fuel injecting means and in which the means for transferring heat from the exhaust gases to the fuel comprises a vessel, means for conducting the exhaust gases through the vessel, and a portion of the fuel line passing through the vessel.

3. A carburetor according to claim 2 for an internal combustion engine having an exhaust manifold, comprising first conduit means communicating at one end with said vessel and adapted to communicate at the other end with the exhaust manifold and second conduit means communicating at one end with said vessel at a point remote from the communication of the first conduit means with said vessel and communicating at the other end with said means for transferring heat from the exhaust gases to the housing and the porous matter.

4. A carburetor according to claim 3, in which the housing includes a base and the means for transferring heat from the exhaust gases to the housing and the porous matter comprises passages formed in the base for the conducting of the exhaust gases therethough.

* * * * *